(12) United States Patent
Gaunekar et al.

(10) Patent No.: US 8,109,395 B2
(45) Date of Patent: Feb. 7, 2012

(54) GANTRY POSITIONING SYSTEM

(75) Inventors: Ajit Gaunekar, Singapore (SG); Gary Peter Widdowson, Hong Kong (CN)

(73) Assignee: ASM Technology Singapore Pte Ltd, Singapore (SG)

( * ) Notice: Subject to any disclaimer, the term of this patent is extended or adjusted under 35 U.S.C. 154(b) by 1240 days.

(21) Appl. No.: 11/338,260

(22) Filed: Jan. 24, 2006

(65) Prior Publication Data
US 2007/0170140 A1 Jul. 26, 2007

(51) Int. Cl.
*B66D 5/02* (2006.01)
(52) U.S. Cl. ........................................................ 212/324
(58) Field of Classification Search ............... 212/312, 212/313, 324
See application file for complete search history.

(56) References Cited

U.S. PATENT DOCUMENTS

| | | | | |
|---|---|---|---|---|
| 3,763,479 A | * | 10/1973 | Jebb et al. ....................... 358/1.3 |
| 4,468,160 A | * | 8/1984 | Campbell, Jr. ................. 409/202 |
| 4,637,738 A | * | 1/1987 | Barkley ............................ 384/38 |
| 4,655,594 A | * | 4/1987 | Wittekoek et al. ............ 356/500 |
| 4,658,485 A | | 4/1987 | Yang ................................. 29/26 |
| 5,176,454 A | * | 1/1993 | Schlereth ......................... 384/45 |
| 5,528,118 A | * | 6/1996 | Lee ........................... 318/568.17 |
| 5,735,173 A | * | 4/1998 | Parker ............................... 74/89 |
| 5,839,323 A | * | 11/1998 | Line ........................... 74/490.07 |
| 5,854,460 A | * | 12/1998 | Graf et al. ................. 219/121.67 |
| 6,157,157 A | * | 12/2000 | Prentice et al. ................ 318/625 |
| 6,196,138 B1 | * | 3/2001 | Sakai et al. ....................... 108/22 |
| 6,223,413 B1 | * | 5/2001 | Crocker et al. ............... 29/524.1 |
| 6,246,203 B1 | | 6/2001 | Abbott et al. .................. 318/649 |
| 6,290,395 B1 | * | 9/2001 | Pletschet .......................... 384/38 |
| 6,372,179 B1 | * | 4/2002 | Marcato ........................... 266/69 |
| 6,495,935 B1 | * | 12/2002 | Mishler ...................... 310/12.04 |
| 6,635,887 B2 | * | 10/2003 | Kwan et al. ................. 250/491.1 |
| 6,761,518 B2 | * | 7/2004 | Stengele et al. .............. 409/235 |
| 6,798,088 B2 | | 9/2004 | Hsu et al. ......................... 310/12 |
| 6,806,991 B1 | * | 10/2004 | Sarkar et al. .................. 359/290 |
| 6,852,989 B2 | | 2/2005 | Kwan et al. ................. 250/491.1 |
| 7,743,998 B2 | * | 6/2010 | Katoh et al. ................... 235/486 |
| 2003/0067592 A1 | * | 4/2003 | Tim Poon et al. .............. 355/75 |
| 2004/0261249 A1 | * | 12/2004 | Smith et al. ..................... 29/559 |

FOREIGN PATENT DOCUMENTS

JP 6-20405 A * 1/1994

OTHER PUBLICATIONS

European Search Report dated Apr. 30, 2007.

* cited by examiner

*Primary Examiner* — Emmanuel M Marcelo
(74) *Attorney, Agent, or Firm* — Ostrolenk Faber LLP

(57) ABSTRACT

A gantry system is provided that comprises a gantry beam having a first section and a second section and first and second motors cooperating to drive the respective first and second sections in parallel directions to position the gantry beam along a linear axis. A flexure is connected between the first and second sections about which the second section is deflectable relative to the first section, which is advantageous to reduce any stresses that may be caused in the gantry system when driving the gantry beam.

15 Claims, 4 Drawing Sheets

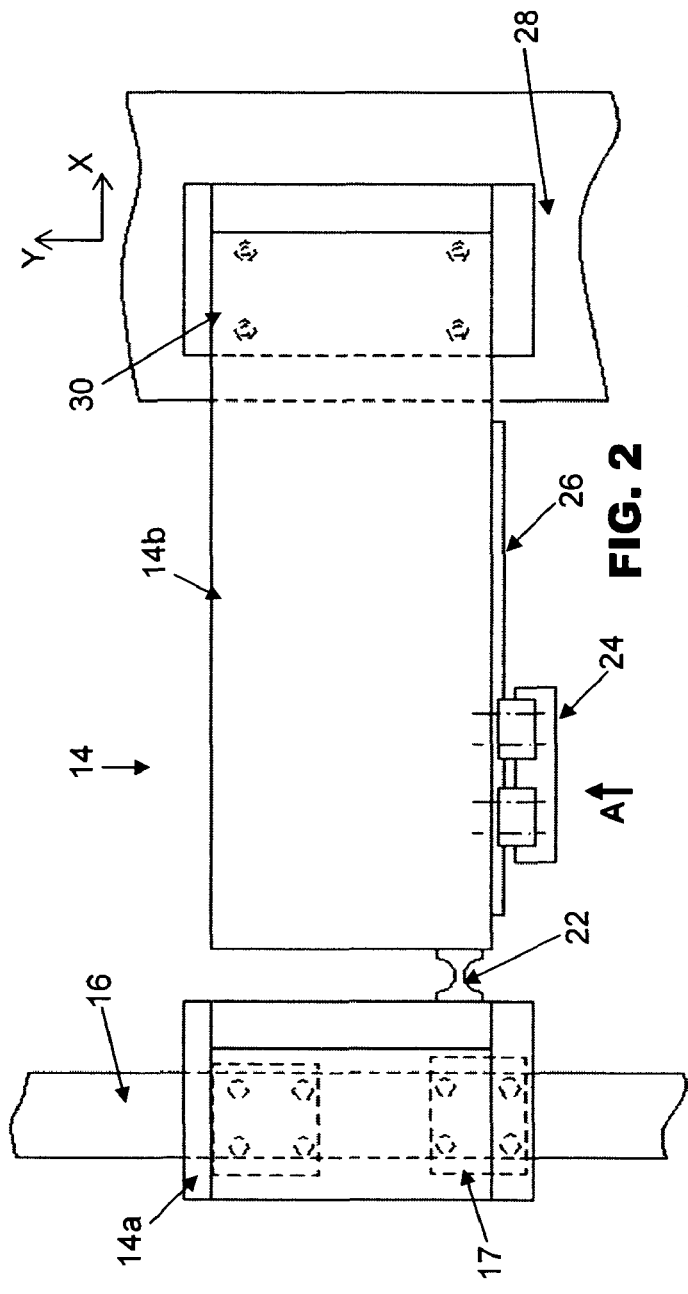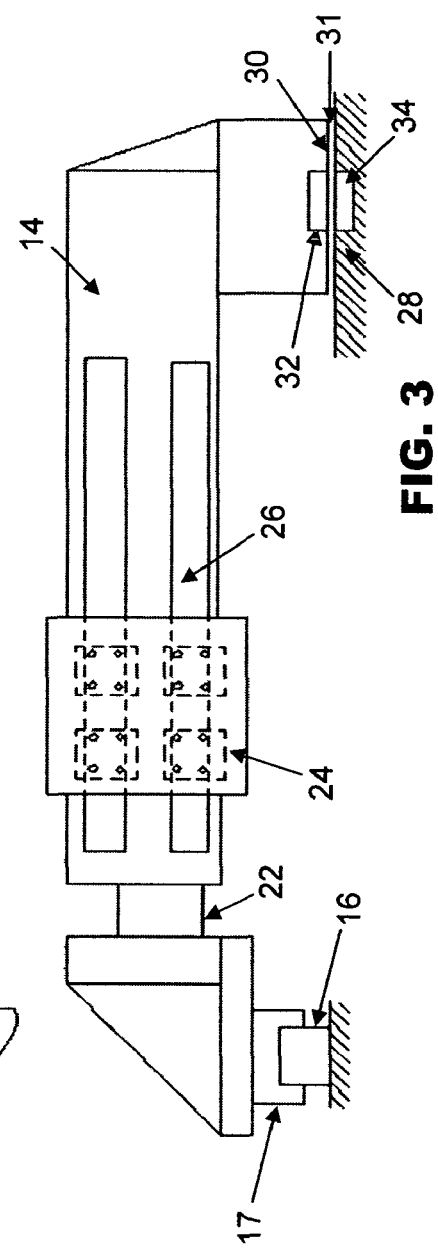

US 8,109,395 B2

GANTRY POSITIONING SYSTEM

FIELD OF THE INVENTION

The invention relates to a movable gantry system on which a device is mountable for performing an operation within a work area, and in particular to a system for precisely controlling a position of the movable gantry.

BACKGROUND AND PRIOR ART

Gantry systems can be widely used for a range of applications, from assembly and electronic manufacturing, to vision systems and industrial automation. In semiconductor assembly and packaging, positioning systems using gantries are useful where a work space spans a predefined area and it is necessary to position a device accurately at various positions within the area.

References herein to gantry systems are to be understood as including multi-axis positioning systems whereby a device is required to be accurately positioned in a two dimensional plane or a three dimensional space. In a typical two dimensional arrangement, the device is supported by a carriage which is movable back and forth in a first direction along a gantry beam. The gantry beam is movable back and forth in a second direction which is typically perpendicular to the first direction. The gantry beam is typically supported at both ends by a pair of carriages. If movement in three dimensions is required, the device is movably supported on the carriage so that the device is moveable in a third direction which is typically perpendicular to both the first and second directions. The three directions are typically orthogonal XYZ axes.

Travel distance, speed, acceleration, accuracy of placement and reliability are relevant factors for consideration in the design of gantry systems. Accuracy of placement and repeatability are especially critical for demanding applications where a tool or device must be positioned accurately with only a small margin for error. Conventionally, gantry systems utilized ball screw-based mechanisms and AC servomotors for driving the gantry. However, ball screws have inherent drawbacks such as relatively slow speed and lower precision.

More recently, linear motors have been introduced for driving the gantry systems and these have significantly improved performance, speed and reliability as compared to conventional ball screw systems. An example is U.S. Pat. No. 6,798,088 entitled, "Structure for Symmetrically Disposed Linear Motor Operated Tool Machine". The gantry structure comprises two sustaining walls erected in parallel and a movable gantry that can reciprocate along slide rails laid on the sustaining walls. The movable gantry is driven by symmetrically-disposed high output linear motors. A disadvantage of such a design is that it does not cater to thermal expansion during operation and possible asynchronous operation of the motors driving the beam. As the gantry structure is quite rigid, the slide rails will encounter stress when the motors drive the gantry by an unequal distance or unequal force. Positioning accuracy will be affected and the slide rails will also face excessive loads and greater wear.

To address this problem, some flexibility may be introduced to the interface between the linear guides and the movable gantry, such as in U.S. Pat. No. 6,852,989 entitled, "Positioning System for Use in Lithographic Apparatus". A positioning system that is used to position a movable object table in three degrees of freedom is described. The movable gantry is coupled rigidly to sliders mounted on parallel side beams in at least two axes to form a rigid body in the horizontal X-Y plane. A thrust bearing is pivotally mounted to at least one slider relative to a side beam for transmitting forces in the X-Y plane and perpendicular to the respective side beam between the movable gantry and the side beam.

If the gantry is displaced to effect yaw positioning of the beam, the linear motors of the sliders will be correspondingly rotated relative to their tracks. This compensates for thermal expansion and asynchronous operation, but on the other hand, it introduces various design complexities. Furthermore, the design introduces an extra degree of freedom of movement to the gantry to alleviate high stresses on the linear guides during yaw by providing extra rotary degrees of freedom at both ends. Unfortunately, an excess of rotary degrees of freedom leads to the gantry system having limited stiffness to counter roll and pitch movements, which ought to be high in order to achieve the requisite accuracy and dynamic performance.

It would be desirable to keep the overall design of the gantry system as simple as possible by assembling the system with fewer parts, and yet be able to achieve high positioning accuracy for the gantry.

SUMMARY OF THE INVENTION

It is thus an object of the invention to seek to provide a gantry positioning system that reduces some of the aforesaid disadvantages of prior art gantry systems to achieve simplicity and placement accuracy.

Accordingly, the invention provides a gantry system comprising: a gantry beam having a first section and a second section; first and second motors cooperating to drive the respective first and second sections in parallel directions to position the gantry beam along a linear axis; and a flexure connected between the first and second sections about which the second section is deflectable relative to the first section.

It would be convenient hereinafter to describe the invention in greater detail by reference to the accompanying drawings which illustrate preferred embodiments of the invention. The particularity of the drawings and the related description is not to be understood as superseding the generality of the broad identification of the invention as defined by the claims.

BRIEF DESCRIPTION OF THE DRAWINGS

An example of a preferred embodiment of a gantry system in accordance with the invention will now be described with reference to the accompanying drawings, in which:

FIG. 2 is a plan view of the gantry system;

FIG. 3 is a side view of the gantry system looking from direction A of FIG. 2;

DETAILED DESCRIPTION OF THE PREFERRED EMBODIMENT OF THE INVENTION

Figure 1:
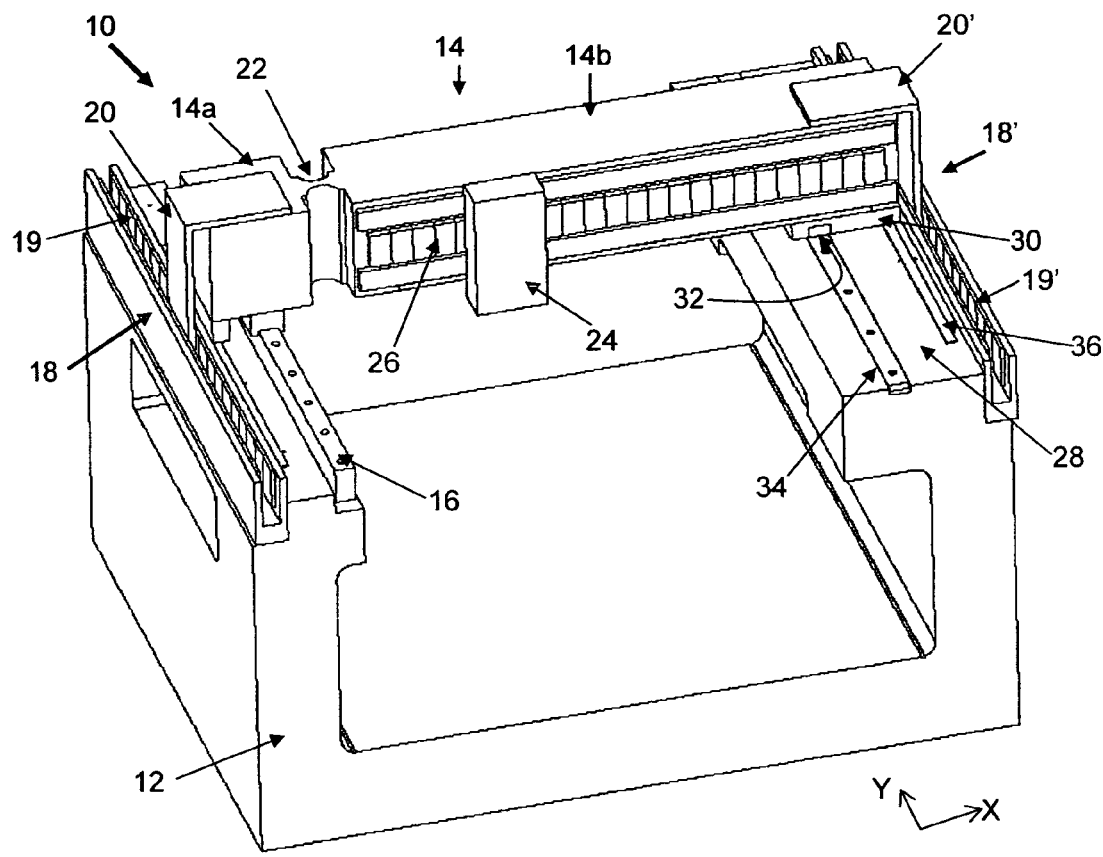
FIG. 1 is an isometric view of a gantry system according to the preferred embodiment of the invention.

FIG. 1 is an isometric view of a gantry system 10 according to the preferred embodiment of the invention. The gantry system 10 generally comprises a base support 12 which includes vertical sidewalls, a gantry beam 14 having separate sections 14a, 14b and supported at its respective ends by each vertical sidewall, a linear guide such as a guide rail 16 for guiding movement of one section 14*a* of the gantry beam 14 along one vertical sidewall, and a bearing such as an air bearing for supporting a second section 14*b* of the gantry beam 14 along the other vertical sidewall.

There is a pair of motors, which may be in the form of linear motors 18, 18' each driving a respective end of the first section 14*a* and the second section 14*b* substantially synchronously in parallel directions to position the gantry beam 14 along a linear axis (ie. the Y axis in FIG. 1). Each linear motor 18, 18' comprises a magnet assembly 19, 19' including rows of magnets cooperating with a coil bracket 20, 20' including coil windings which is movable relative to the magnet assembly 19, 19'. The magnet assemblies 19, 19' are mounted to the base support 12 whereas the coil brackets 20, 20' are mounted to the gantry beam 14.

The gantry beam 14 is preferably made from aluminum or aluminum alloy. Flexibility in the gantry beam 14 is introduced by incorporating a flexure 22 which separates the two sections of the gantry beam 14. Preferably, the flexure 22 is located substantially nearer to the guide rail 16 than to the air bearing. The section 14*a* resting on the guide rail 16 has higher inherent rigidity than the other section 14*b* resting on the air bearing, because the guide rail 16 rigidly guides its movement along the linear Y axis. The flexure 22 allows the second section to be deflectable relative to the first section about the flexure 22.

The flexure 22 may be integrally formed with the rest of the gantry beam 14 by cutting material from the gantry beam and shaping it to create the shape of the flexure 22. Alternatively, the flexure 22 may comprise a separate component that is mounted to the separate sections of the gantry beam 14.

The flexure 22 is preferably arranged vertically and cut in a direction that is traverse to the motion direction of the gantry beam 14 along the X-Y plane so that there is a degree of freedom of movement, albeit limited, in the directions parallel to the linear axis along which the gantry beam 14 is drivable by the linear motors 18, 18'. This limited degree of freedom is to cater for asynchronous operation of the respective linear motors 18, 18'. At the same time, the flexure 22 is rigid and restricts freedom of movement in other directions to restrict pitch or rolling motion.

The flexure 22 is designed to give a reasonably low frequency fundamental mode in bending while providing sufficiently high dynamic stiffness for higher frequency modes. It has also been designed to have adequate load carrying capacity while containing a maximum stress level well below the endurance level of the material used. The flexure is preferably made from aluminum, aluminum alloy, steel or titanium alloy where it comprises a separate component. However, other high-strength materials may also be suitable.

A mounting bracket 24 for mounting a device, such as a bonding or pick-and-place device, is slidably mounted on the gantry beam 14 and is movable along an axis parallel to the length of the gantry beam 14 (ie. the X axis in FIG. 1). The mounting bracket 24 is preferably drivable by another linear motor 26. For convenience, the axis along which the mounting bracket 24 is slidably movable is referred to as the X axis and the axis along which the guiding rail 16 guides the gantry beam 14 is referred to as the Y axis. It would be appreciated that a combination of movement of the mounting bracket 24 in the X and Y axes driven by the respective linear motors serve to position a device mounted on the mounting bracket 24 to various locations on an X-Y plane.

The end of the gantry beam 14 opposite to the end guided by the guide rail 16 is supported by an air bearing having a high stiffness but supports the second section 14*b* relatively less rigidly than the guide rail 16 for movement along the linear axis such that the second section 14*b* is deflectable relative to the first section 14*a*. The air bearing comprises an air bearing support surface 28 and an air bearing pad 30 facing each other, with a gap created between the surfaces by pressurized air injected between the surfaces to separate them. To enhance the stiffness of the air bearing, a pre-loading magnetic sub-assembly 32 is arranged so as to be attracted to a magnetic pre-load strip 34 laid out on the air bearing support surface 28 which is generally aligned with a traveling path of the pre-loading loading magnetic sub-assembly 32. There is a position encoder system 36 for determining the position of the gantry beam 14 at any given time along the Y axis.

FIG. 2 is a plan view of the gantry system 10. For simplicity of illustration, the linear motors 18, 18' located at the respective ends of the gantry beam 14 have been removed. This view shows that the mounting bracket 24 is movable along the gantry beam 14 on the X axis and the gantry beam 14 is movable along the guide rail 16 on the Y axis. The gantry beam 14 is supported on the guide rail 16 by a set of linear guide blocks 17 containing re-circulating rolling elements such as balls or rollers at one end and is supported on the other end by an air bearing comprising the air bearing support surface 28 and the air bearing pad 30.

FIG. 3 is a side view of the gantry system looking from direction A of FIG. 2. It shows the gantry beam 14 supported on the guide rail 16 by the linear guide blocks 17. It also shows the guide rail 14 supported on the air bearing comprising an air gap 31 formed between the air bearing support surface 28 and the air bearing pad 30. The air gap 31 is created by pressurized air injected by the air bearing pad 30 towards the air bearing support surface 28. To enhance the stiffness of the air bearing, a pre-load force is created by way of the magnetic pre-load strip 34 attracting the pre-loading magnetic sub-assembly 32.

Figure 4:
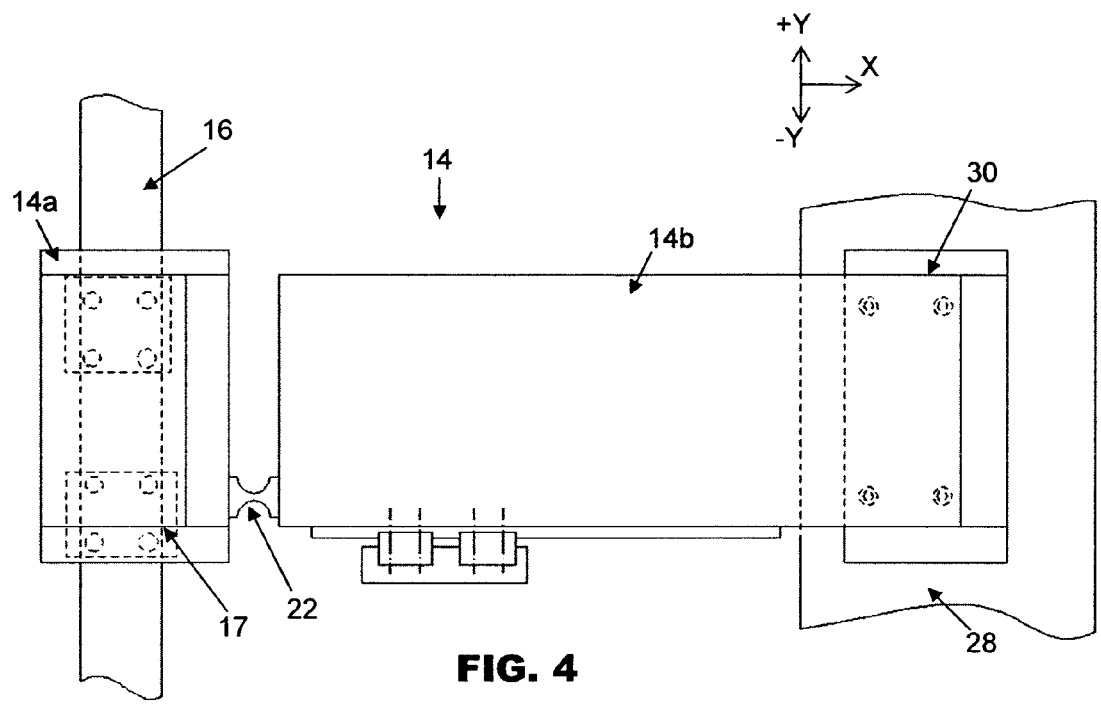
FIG. 4 is a plan view of a gantry beam that is aligned parallel to an X axis of the gantry system.

FIG. 4 is a plan view of the gantry beam 14 that is aligned parallel to an X axis of the gantry system 10. The gantry beam 14 is drivable in the +Y and −Y directions by first and second linear motors 18, 18' at its respective ends. During operation, it is preferable that the two ends of the gantry beam 14 are driven simultaneously by the same distance so that the beam is maintained parallel to the X axis. However, if there is asynchrony between the linear motors 18, 18', an end driven by one linear motor 18' may be driven further than another end driven by the other linear motor 18.

Figure 5:
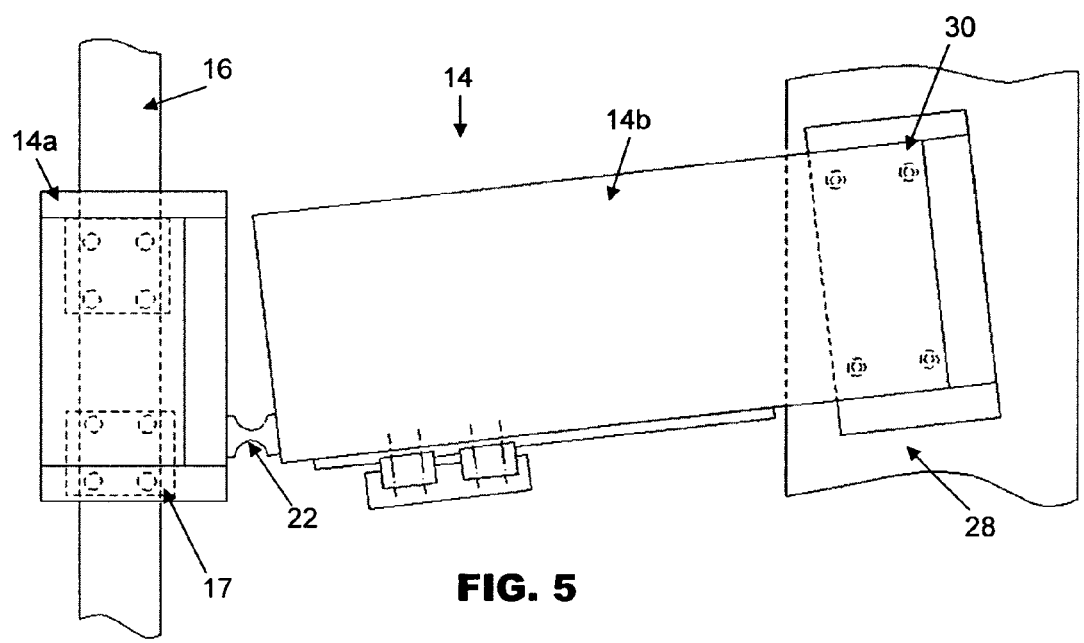
FIG. 5 is a plan view of the gantry beam rotated in one direction when opposite ends of the beam are misaligned.

FIG. 5 is a plan view of the gantry beam 14 biased in one direction when opposite ends of the beam 14 are misaligned. In this case, if the gantry beam 14 is rigid in the X-Y plane, it would cause stress on the linear guide guiding the movement of the gantry beam 14. However, with the flexure 22 incorporated into the gantry beam 14, one section 14*b* of the beam 14 is allowed to deflect and rotate due to the limited degree of movement of an end of the gantry beam 14 supported on the air bearing. The other section 14*a* at the opposite end of the gantry beam 14 remains relatively fixed. Thus, it can be observed that although the end of the gantry beam 14 guided by the guide rail 16 is relatively stiff on a rotary axis, the section of the gantry beam 14 supported by the air bearing rotates in the +Y direction where excess movement of the linear motor 18' is present, thereby reducing the stresses on the system 10.

It should be noted, however, that the extent of motion in FIG. 5 is exaggerated for the purpose of illustration. In actual operation using state-of-the-art high precision motors and position encoders, it is likely that the degree of rotation will be limited to a few arc seconds. This deviation will be immediately corrected by a closed loop control system using the linear motor 18' and position encoder system 36 on the air bearing side of the gantry beam 14.

Figure 6:
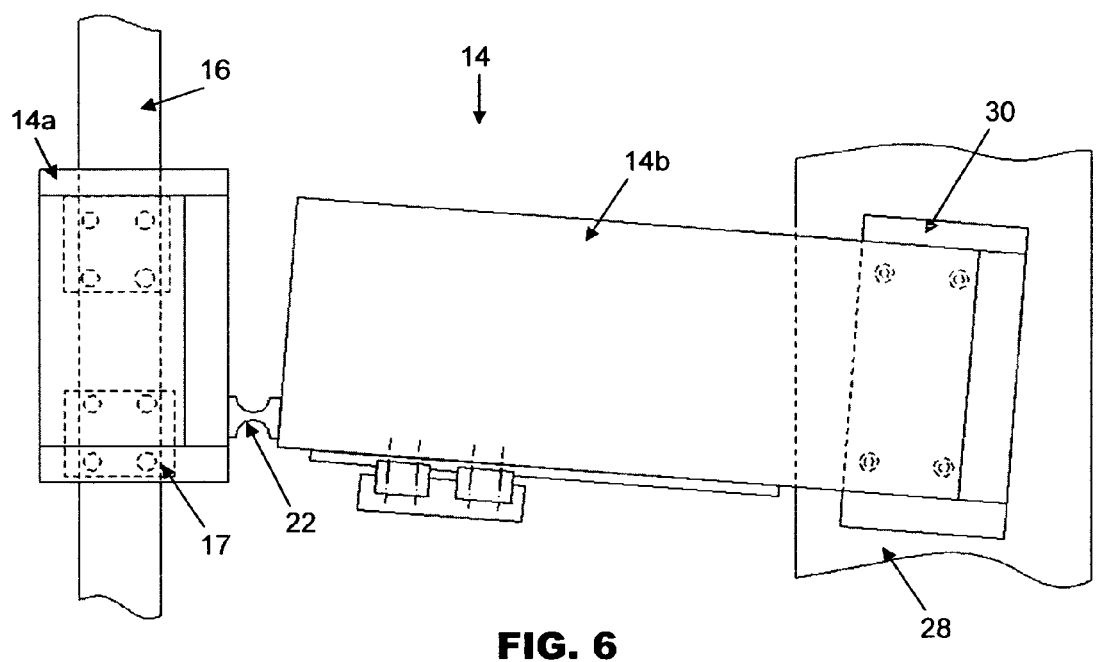
FIG. 6 is a plan view of the gantry beam rotated in an opposite direction when opposite ends of the beam are misaligned.

Similarly, if the end driven by the second linear motor 18' is moved further than the end driven by the first linear motor 18 in the −Y direction, the section 14b of the gantry beam 14 supported by the air bearing may appear to be rotated in an opposite direction. FIG. 6 is a plan view of the gantry beam 14 rotated in the opposite direction when opposite ends of the beam 14 are misaligned. With the degrees of freedom limited in the aforesaid directions, stresses on the guide rails 16 due to asynchrony of the linear motors 18, 18' can be reduced to a negligible level.

It should be appreciated that the gantry positioning system according to the preferred embodiment of the invention simplifies assembly of the gantry, while ensuring placement accuracy, fast dynamic response and an enhanced maintenance-free lifespan of the gantry system.

The invention described herein is susceptible to variations, modifications and/or additions other than those specifically described and it is to be understood that the invention includes all such variations, modifications and/or additions which fall within the spirit and scope of the above description.

The invention claimed is:

1. A gantry system comprising:
   a gantry beam having a rigid first section and a rigid second section;
   a first motor directly attached to the first section and a second motor directly attached to the second section, the first and second motors cooperating to drive the respective first and second sections in parallel directions along a linear axis to position the gantry beam;
   a flexure located along a length of the gantry beam extending between the first and second motors, the flexure being connected to the first and second sections such that the second section is deflectable relative to the first section about the flexure in directions parallel to the linear axis; and
   a mounting bracket configured to mount a bonding device or a pick-and-place device, the mounting bracket being slidably mounted on the gantry beam to position the bonding device or the pick-and place device.

2. The gantry system as claimed in claim 1, including a linear guide for guiding movement of the first section rigidly along the linear axis and a bearing for supporting the second section relatively less rigidly for movement along the linear axis such that the second section is deflectable relative to the first section.

3. The gantry system as claimed in claim 2, wherein the linear guide comprises a guide rail.

4. The gantry system as claimed in claim 3, wherein the first section is supported on the guide rail by linear guide blocks containing re-circulating roller elements.

5. The gantry system as claimed in claim 2, wherein the bearing comprises an air bearing.

6. The gantry system as claimed in claim 5, wherein the air bearing comprises an air bearing support surface and an air bearing pad with a gap created between the surfaces by pressurized air injected into the gap.

7. The gantry system as claimed in claim 6, wherein the air bearing support surface and air bearing pad further comprise a pre-load strip and a pre-loading magnetic sub-assembly respectively that are configured to attract the air bearing pad towards the air bearing support surface.

8. The gantry system as claimed in claim 2, wherein the flexure is located substantially nearer to the linear guide than to the bearing.

9. The gantry system as claimed in claim 1, wherein the first and second motors comprise linear motors.

10. The gantry system as claimed in claim 1, wherein the flexure is integrally formed from the gantry beam by cutting and shaping therefrom.

11. The gantry system as claimed in claim 1, wherein the flexure is a separate component mounted to the first and second sections.

12. The gantry system as claimed in claim 1, wherein the flexure is configured to be rigid and restricts freedom of movement in directions which are not parallel to the linear axis along which the gantry beam is driven.

13. The gantry system as claimed in claim 1, wherein the flexure is configured to give a low frequency fundamental mode in bending while providing high dynamic stiffness for higher frequency modes.

14. The gantry system as claimed in claim 1, wherein the flexure is made from a material selected from the group consisting of: aluminum, aluminum alloy, steel and titanium alloy.

15. The gantry system as claimed in claim 1, wherein the gantry beam is made from aluminum or aluminum alloy.

* * * * *